United States Patent
Matus et al.

(10) Patent No.: US 10,615,669 B2
(45) Date of Patent: Apr. 7, 2020

(54) PROTECTION DEVICE AND SYSTEM USING NEGATIVE CAPACITANCE COMPONENT

(71) Applicant: Littelfuse, Inc., Chicago, IL (US)

(72) Inventors: Yuriy B. Matus, Pleasanton, CA (US); Kedar Bhatawadekar, Santa Clara, CA (US); Martin Pineda, Fremont, CA (US); Werner Johler, Samstagern (CH)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 16/245,538

(22) Filed: Jan. 11, 2019

(65) Prior Publication Data

US 2019/0222100 A1 Jul. 18, 2019

Related U.S. Application Data

(60) Provisional application No. 62/766,593, filed on Jan. 12, 2018.

(51) Int. Cl.
| | |
|---|---|
| *H02H 5/04* | (2006.01) |
| *H02K 11/02* | (2016.01) |
| *H01C 7/02* | (2006.01) |
| *H02H 7/085* | (2006.01) |
| *H01G 7/06* | (2006.01) |

(52) U.S. Cl.
CPC .............. *H02K 11/02* (2013.01); *H01C 7/02* (2013.01); *H01G 7/06* (2013.01); *H02H 7/085* (2013.01)

(58) Field of Classification Search
CPC .............................. H02H 7/085; H02K 11/02
See application file for complete search history.

(56) References Cited

U.S. PATENT DOCUMENTS

| | | | |
|---|---|---|---|
| 2005/0110469 A1* | 5/2005 | Inaba ..................... | H02M 3/156 323/222 |
| 2008/0258711 A1* | 10/2008 | Niroomand .......... | G01R 15/146 324/140 R |
| 2011/0009679 A1* | 1/2011 | Rappe .................... | B01J 23/628 585/16 |
| 2014/0152016 A1* | 6/2014 | Jennings ................. | F03G 7/08 290/55 |
| 2014/0233296 A1* | 8/2014 | Noh .................. | H01L 27/11507 365/145 |
| 2017/0082740 A1* | 3/2017 | Kitchens, II ........ | G06K 9/00899 |
| 2019/0222040 A1* | 7/2019 | Guo ......................... | H02H 3/20 |

* cited by examiner

*Primary Examiner* — Karen Masih

(57) ABSTRACT

A protection device may include a resistor, the resistor including a first end for coupling between a load and a second end for coupling to a DC source. The protection device may also include a capacitor having a first terminal coupled between the second end of the resistor and the DC source, and a second terminal coupled to ground, the capacitor further comprising a capacitor body, wherein the capacitor body comprises a ferroelectric material.

12 Claims, 3 Drawing Sheets

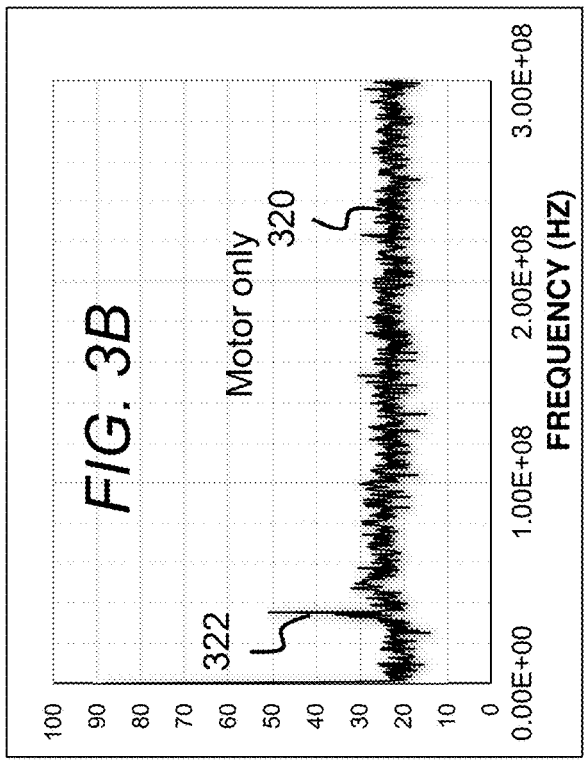
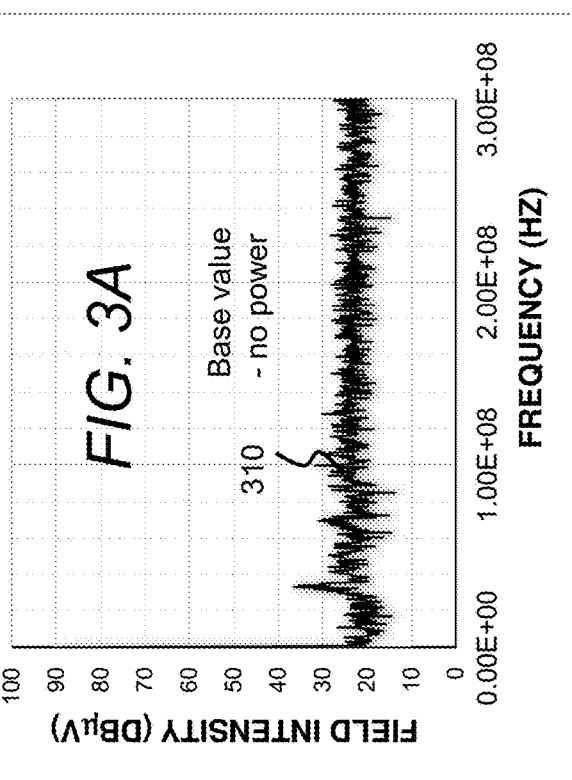
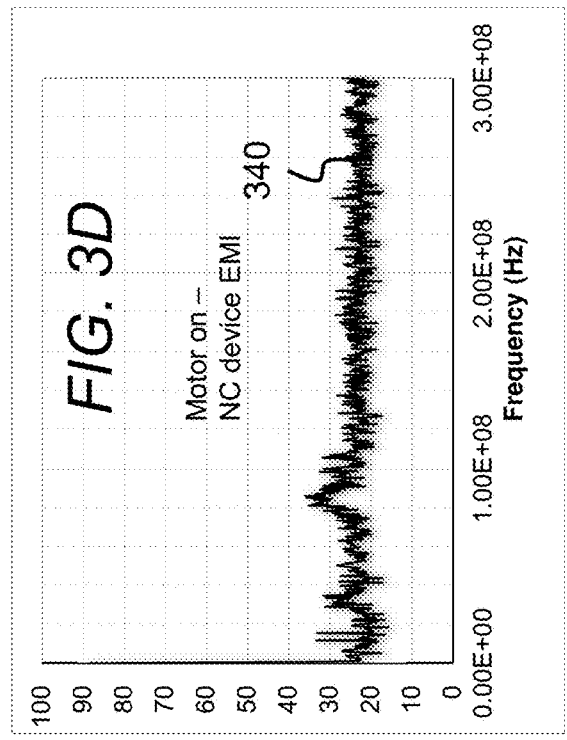
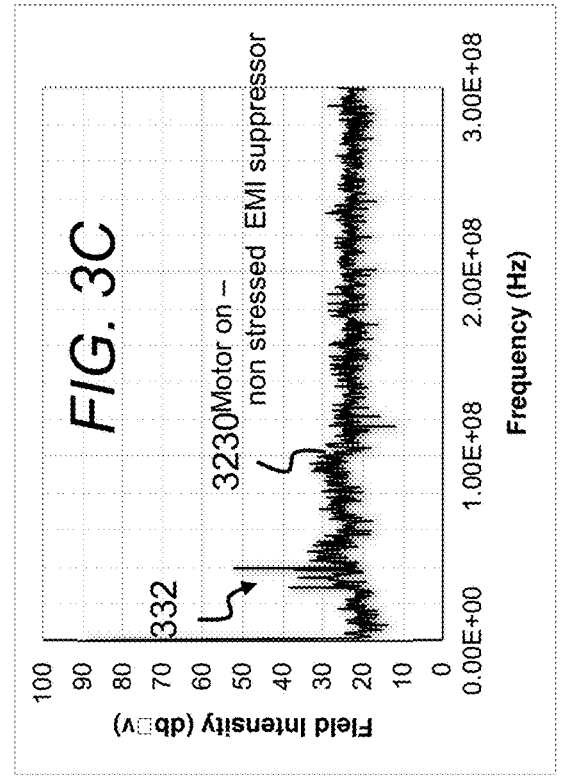

PROTECTION DEVICE AND SYSTEM USING NEGATIVE CAPACITANCE COMPONENT

RELATED APPLICATIONS

This application claims priority to U.S. Provisional Patent Application No. 62/766,593, effectively filed Jan. 12, 2018, entitled PROTECTION DEVICE AND SYSTEM USING NEGATIVE CAPACITANCE COMPONENT, and incorporated by reference herein in its entirety.

BACKGROUND

Field

Embodiments relate to the field of circuit protection devices, including noise filters.

Discussion of Related Art

Devices such as motors during routine operation may generate electromagnetic interference (EMI) with nearby components. Conventional EMI protection from motors may be provided by providing chokes and additional capacitor grounded inserted prior to a motor. This scheme entails the use of two inductors-chokes and a capacitor. However, there is a need for improved protection to filter out EMI from motors or reducing a number of elements in EMI suppression scheme.

In view of the above, the present embodiments are provided.

BRIEF DESCRIPTION OF THE DRAWINGS

FIG. 3A presents a background noise spectrum;

FIG. 3B presents a noise spectrum in the presence of a motor with no filter;

FIG. 3C presents a noise spectrum in the presence of a motor with a known passive filter;

FIG. 3D presents a noise spectrum in the presence of a motor with a negative capacitance filter according to embodiments of the disclosure;

DESCRIPTION OF EMBODIMENTS

Figure 1:
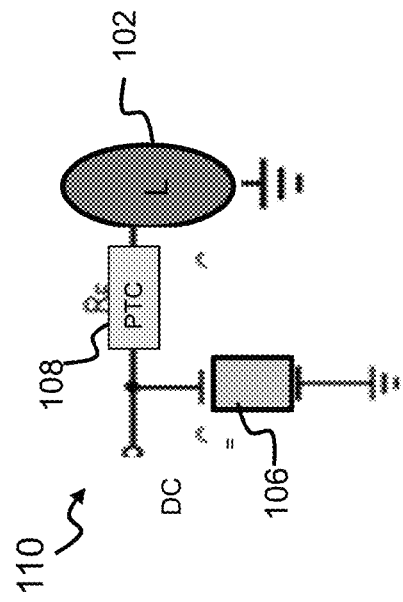
FIG. 1 shows a protection device according to various embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, systems and devices are provided for providing EMI protection. According to some embodiments, a protection device including a circuit is provided where a resistor and a capacitor are provided for filtering noise.

Turning to FIG. 1 there is shown a protection device 100, according to embodiments of the disclosure. The protection device 100 may include a resistor 104 having a first end configured to couple to a load 102 and a second end configured to couple to a DC source, for example. The protection device 100 may also include a capacitor 106, having a first terminal coupled between the second end of the resistor 104 and the DC source, where a second terminal of the capacitor 106 is coupled to ground. The capacitor 106 may further include a capacitor body 106A, wherein the capacitor body 106A comprises a ferroelectric material.

According to some embodiments, the ferroelectric material may be a ceramic material, such as lithium tantalate, $PbZr/TiO_3$, $BaTiO_3$, or $PbTiO_3$. In other embodiments, the ferroelectric material may be triglycine sulfate. In some embodiments, the capacitor body 106A may be a composite, wherein the ferroelectric material is embedded within or intermixed with a non-ferroelectric material. For example, the non-ferroelectric material may be a polyimide, a polyamide, a polyester, polymethylmethacrylate, an epoxy, or a monomeric material.

In some embodiments, the ferroelectric material of capacitor body 106A may be a stretched polyvinylidene fluoride (PVDF) film, a poled polyvinylidene fluoride (PVDF) film, a stretched and poled polyvinylidene fluoride (PVDF) film, while in particular embodiments, the ferroelectric material may be a copolymer including PVDF.

According to some embodiments, the protection device 100 may serve as a filter to dampen or eliminate EMI generated from a motor. As such, the protection device 100 may be integrated with a motor or other components to be protected from EMI generated by the motor. As detailed below, the protection device 100 may operate to dampen or eliminate EMI by virtue of unique properties of the capacitor 106.

Figure 2:
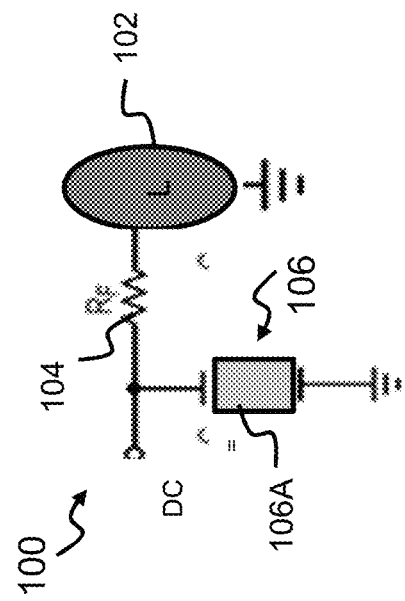
FIG. 2 shows a protection device according to other embodiments of the disclosure.

In additional embodiments of the disclosure a protection device may include an EMI filter and a switch. FIG. 2 depicts an embodiment of a protection device 110, having a similar circuit configuration as the embodiment of FIG. 1. In this embodiment, a positive temperature coefficient (PTC) component, shown as PTC component 108, is arranged in the position of the resistor 104. The protection device 110 may serve to protect a component such as a motor to regulate operation, while also filtering EMI generated by the motor. As an example, during normal operation, the PTC component 108 may function as a resistor, operating in conjunction with the capacitor 106 to filter EMI. Above a threshold of heat or current, the protection device 110 may also act as a switch to regulate or eliminate current as in known PTC devices.

In accordance with various embodiments, the present inventors have discovered that when a stretched (stressed) membrane of PVDF is used as the capacitor 106, such as in the circuit of FIG. 1, EMI noise may be suppressed. Contrariwise, when an unstretched membrane of PVDF is arranged as capacitor 106, the resulting voltage divider does not suppress noise. While not limited to any particular theory, the action of the stretched membrane of PVDF to suppress noise may be due to special properties of the stretched PVDF. PVDF forms as a crystalline or semicrystalline polymer. PVDF may crystallize into different phases, such as the alpha phase. The alpha phase of PVDF is a non-ferroelectric phase, while a beta-phase is a ferroelectric phase. In addition, poling of a PVDF material may increase the crystalline orientation of the PVDF. By stretching of a PVDF film and poling, the ferroelectric effect within the PVDF material may be increased. As is known, a ferroelectric material is characterized by having a stable thermodynamic state where spontaneous electric polarization is present within the ferroelectric material. A given crystalline ferroelectric material may have two stable states where the free energy is at a minimum, characterized by displacement of a charged species in opposite directions from a center of symmetry. Recently, research has shown that a ferroelectric may be characterized as having negative capacitance when the ferroelectric undergoes transitioning between two stable states. Accordingly, the suppression of noise found in the present embodiments employing stretched PVDF membranes may be attributed to the negative capacitance characteristic under polarization of a ferroelectric material, allowing a capacitor to counteract some external noise.

FIG. 3A-3D provide experimental data illustrating properties an EMI filter arranged according to the present embodiments, in comparison to known filter arrangements. In FIG. 3A field intensity of measured signals is shown as a function of frequency for a motor circuit when the power is off. As such, the spectrum 310 represents a baseline value. FIG. 3B shows a spectrum 320, representing the measured signal when a motor is operating without any filter protection. As such, in addition to background noise mimicking the spectrum when the motor is not powered, a spike 322 in intensity is present at a frequency of approximately $3 \times 10^7$ Hz. FIG. 3C shows a spectrum 330, generated when a known passive filter is in place while the motor is operating. The spectrum 330 illustrates spikes 332, in the frequency range of the spike 322 generated by the motor, indicating that the passive filter is not effective in eliminating such EMI. Turning now to FIG. 3D, there is shown a spectrum 340, generated when a protection circuit, such as shown in FIG. 1A is coupled to the motor when the motor is powered. The protection circuit includes a stretched PVDF membrane as described above. In this case, the spectrum 340 illustrates no noise spikes, such as those spikes seen in FIG. 3B and FIG. 3C.

While the noise suppression of FIG. 3D is accomplished using a stretched PVDF membrane, in further embodiments different ferroelectric materials may be used in a capacitor to accomplish similar filtering. Additionally, a ferroelectric capacitor material may be combined with other piezoelectrics to fine tune the properties and closely match the required noise frequency for a given device such as a motor. Additionally, PVDF may be combined in a copolymer to enhance ferroelectric properties. For example, copolymers with trifluoroethylene may enhance formation of a ferroelectric thin layer. In some embodiments, a protection device may include a capacitor made from a piezoelectric component or a pseudo-piezoelectric material having internally generated charges. For example, the pseudo-piezoelectric material may be a plurality of charged particles distributed inside a dielectric matrix.

Figure 4:
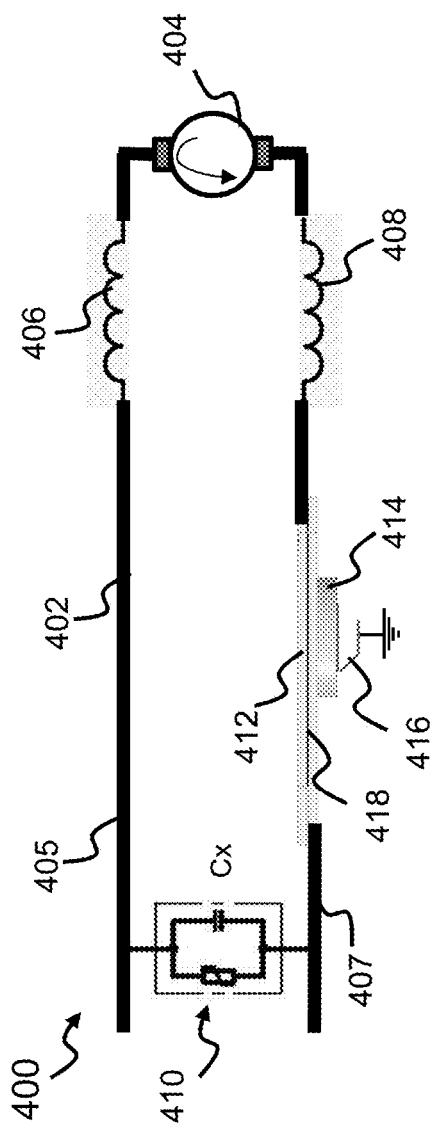
FIG. 4 depicts a protection arrangement, according to embodiments of the disclosure.
Figure 5:
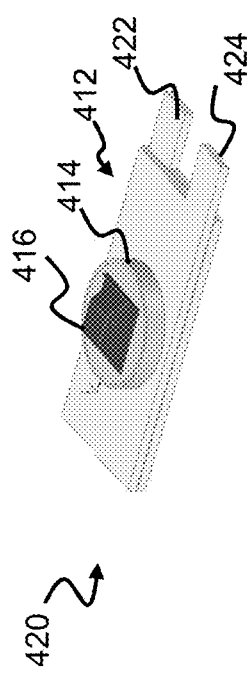
FIG. 5 depicts a component of the protection arrangement of FIG. 4, according to embodiments of the disclosure.

FIG. 4 depicts a protection arrangement 400, according to embodiments of the disclosure. The protection arrangement 400 may be coupled to a motor 404 or similar device through a circuit 402, to form a motor protection assembly. The circuit 402 may include known components such as a circuit arrangement 410, including a capacitor and varistor arranged in electrically parallel fashion between line 405 and line 407. The circuit 402 may further include a choke 406, arranged on line 405, and a choke 408, arranged on line 407, as shown. The circuit 402 may further include a PTC device 412, and as well as a capacitor 414, electrically connected to the PTC device 412, forming the protection device 420. The PTC device includes a PTC layer 418 and a first electrode 422 and second electrode 424, where the first electrode and second electrode are in electrical series in the circuit 402. The capacitor 414 may be a ferroelectric capacitor as described above, and may be coupled to ground through an electrically conductive part, such as a spring clip 416. As such, the capacitor 414 and PTC device 412 may form a protection device 420, which component may be placed in a circuit for overcurrent protection, as well as EMI filtering. A perspective view of the protection device 420 is shown in FIG. 5. Notably, the protection device 420 may substitute for known components in conventional EMI filters, such as two Cy capacitors as well as a pair of associated chokes. Moreover, the higher capacitance Cy capacitors, such as 100 nF may be replaced by a lone capacitor of lower capacitance, such as 10 nF.

In accordance with additional embodiments, a protection device may include a capacitor and resistor arranged on a flexible substrate. The flexible substrate may provide the advantage that the protection device can be accommodated of placed in existing device configurations or substituted readily for existing protection devices.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A protection device, comprising:
   a resistor, the resistor including a first end for coupling between a load and a second end for coupling to a DC source; and
   a capacitor having a first terminal coupled between the second end of the resistor and the DC source, and a second terminal coupled to ground, the capacitor further comprising a capacitor body, wherein the capacitor body comprises a ferroelectric material comprising a stretched polyvinylidene fluoride (PVDF) film.

2. The protection device of claim 1, the ferroelectric material comprising a poled polyvinylidene fluoride (PVDF) film.

3. The protection device of claim 1, the capacitor comprising a composite, wherein the ferroelectric material is embedded within a non-ferroelectric material.

4. The protection device of claim 3, wherein the non-ferroelectric material comprises a polyimide, a polyamide, a polyester, polymethylmethacrylate, an epoxy, or a monomeric material.

5. The protection device of claim 1, wherein the resistor and the capacitor are printed within a flexible substrate.

6. The protection device of claim 1, wherein the resistor comprises a positive temperature coefficient (PTC) device.

7. The protection device of claim 1, further comprising a piezoelectric component, coupled to the capacitor.

8. The protection device of claim 1, wherein the capacitor includes a pseudo-piezoelectric material having internally generated charges.

9. The protection device of claim 8, wherein the pseudo-piezoelectric material comprises a plurality of charged particles distributed inside a dielectric matrix.

10. A motor protection assembly, comprising:
- a motor, having a first side, coupled to a first line and a second side, coupled to a second line;
- a circuit arrangement, coupled between the first line and the second line; and
- a protection device, coupled along the second line, and in electrical series between the circuit arrangement and the motor, wherein the protection device comprises:
  - a PTC device; and
  - a capacitor, wherein the capacitor comprises a ferroelectric material.

11. The motor protection assembly of claim 10, wherein the capacitor is coupled to ground.

12. The motor protection assembly of claim 10, further comprising a first choke, arranged on the first line, and a second choke, arranged on the second line.

* * * * *